(12) United States Patent
Kawatani

(10) Patent No.: US 9,455,428 B2
(45) Date of Patent: Sep. 27, 2016

(54) BATTERY UNIT CONNECTION STRUCTURE OF ELECTRIC VEHICLE

(71) Applicant: HONDA MOTOR CO., LTD., Tokyo (JP)

(72) Inventor: Shinji Kawatani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 750 days.

(21) Appl. No.: 13/848,181

(22) Filed: Mar. 21, 2013

(65) Prior Publication Data

US 2013/0280572 A1  Oct. 24, 2013

(30) Foreign Application Priority Data

Mar. 30, 2012  (JP) .................................. 2012-081511

(51) Int. Cl.
| | |
|---|---|
| *B60L 11/18* | (2006.01) |
| *H01M 2/10* | (2006.01) |
| *B60L 11/00* | (2006.01) |

(52) U.S. Cl.
CPC .......... *H01M 2/1083* (2013.01); *B60L 11/007* (2013.01); *B60L 11/1822* (2013.01); *B60L 11/1877* (2013.01); *B60L 2200/12* (2013.01); *H01M 2220/20* (2013.01); *Y02T 10/7005* (2013.01); *Y02T 10/705* (2013.01); *Y02T 10/7072* (2013.01); *Y02T 90/124* (2013.01); *Y02T 90/14* (2013.01)

(58) Field of Classification Search
None
See application file for complete search history.

(56) References Cited

FOREIGN PATENT DOCUMENTS

JP  2008-062814  *  3/2008

* cited by examiner

*Primary Examiner* — Ula C Ruddock
*Assistant Examiner* — Tony Chuo
(74) *Attorney, Agent, or Firm* — Squire Patton Boggs (US) LLP

(57) ABSTRACT

A vehicle can have a battery unit which includes paired supporting shafts protruding in opposite directions. A battery side connector can be supported coaxially with the supporting shafts in a turnable manner. The direction in which the battery side connector is fitted and connected is the direction orthogonal to the supporting shafts. A battery holding block includes paired engaging recessed portions and a vehicle body side connector. The supporting shafts of the battery unit are inserted into the engaging recessed portions from a direction approximately orthogonal to the shaft. The battery side connector is fitted and connected to the vehicle body side connector. The battery unit is operated to turn around the supporting shaft to a position where the battery unit is fixed with the battery holding block.

12 Claims, 14 Drawing Sheets

BATTERY UNIT CONNECTION STRUCTURE OF ELECTRIC VEHICLE

BACKGROUND

1. Field

The present invention relates to a battery unit connection structure of an electric vehicle equipped with a detachable/attachable battery unit as a power supply source.

2. Description of the Related Art

There is known an electric vehicle such as a two-wheeled electric vehicle, in which a battery unit is detachably attached to a battery holding portion of a vehicle body (see, for example, Japanese Patent Publication No. 2008-062814 (Patent Document 1)).

In a battery unit connection structure of an electric vehicle described in Patent Document 1, a battery holding portion is provided at a base portion of a seat post supporting a seat. A battery unit is assembled in an inclined posture to the battery holding portion, and then turned so that the battery unit is positioned along the seat post.

To be specific, in the battery unit connection structure of an electric vehicle, paired supporting shafts projecting toward opposite directions are provided to protrude from outer side surfaces of the battery unit at a lower end thereof, and engaging recessed portions for turnably receiving the paired supporting shafts of the battery unit are provided in the battery holding portion on the vehicle body side. In addition, a battery side connector is provided on a lower surface of the battery unit at a position away from the supporting shafts, and a vehicle body side connector to be fitted and connected with the battery side connector is provided in the battery holding portion at a position corresponding to the battery side connector.

To attach the battery unit to the vehicle body, the paired supporting shafts are first engaged with the corresponding engaging recessed portions with the battery unit set in an inclined posture. In this state, the battery unit is turned around the supporting shafts to fit and connect the battery side connector to the vehicle body side connector. The battery unit is then fixed to the vehicle body by a locking device.

However, in the above-mentioned conventional battery unit connection structure, the battery side connector is connected to the vehicle body side connector by turning the battery unit after engaging the supporting shafts of the battery unit with the corresponding engaging recessed portions on the vehicle body side. Accordingly, an operator connects the battery side connector and the vehicle body side connector without visually checking the connectors. This requires careful work because an attempt to turn the battery unit while the battery side connector and the vehicle body side connector are not properly fit causes a large load to act on a joint of the connectors.

SUMMARY

Embodiments of the present invention aim to provide a battery unit connection structure of an electric vehicle capable of improving workability in attaching a battery unit, by enabling easier and a more reliable connection of a battery side connector to a vehicle body side connector when attaching the battery unit.

A first embodiment of the invention is a battery unit connection structure of an electric vehicle in which a battery unit is detachably attached to a battery holding portion of a vehicle body. The battery holding portion comprises paired engaging recessed portions into which supporting shafts of the battery unit are inserted from a direction orthogonal to the shaft to turnably hold the supporting shafts. A vehicle body side connector is fixedly installed between the paired engaging recessed portions and fitted and connected with a battery side connector. The battery unit comprises paired supporting shafts protruding in opposite directions from outer side surfaces, and the battery side connector supported coaxially with the paired supporting shafts in a turnable manner, and fitted and connected in a direction orthogonal to the supporting shafts. The paired supporting shafts of the battery unit are inserted into the corresponding engaging recessed portions of the battery holding portion from the direction orthogonal to the shaft, while the battery side connector is fitted and connected to the vehicle body side connector, and the battery unit is operated to turn around the supporting shafts to a position where the battery unit is fixed with the battery holding portion while causing the battery side connector to turn relative to the battery unit. Thus, the battery unit is connected and fixed with the battery holding portion.

A second embodiment of the invention is such that the engaging recessed portions of the battery holding portion open toward a direction in which the battery side connector is fitted and connected to the vehicle body side connector when the battery unit is in an initial attachment posture.

In a third embodiment of the invention, the battery unit further comprises a locking claw for locking the turning of the battery side connector, and a biasing spring for biasing the locking claw in a locking direction. The battery holding portion further comprises a release protrusion for displacing the locking claw against a force of the biasing spring to a lock release position, when the battery unit is pushed into a position where the battery side connector and the vehicle body side connector are fitted and connected.

In a fourth embodiment of the invention, the release protrusion is provided in the battery holding portion so that the release protrusion can be operated to protrude from the battery holding portion. The locking claw includes a lock hole into which the release protrusion operated to protrude is fitted to lock turning of the battery unit, when the locking claw is displaced to the lock release position and the battery unit is operated to turn around the supporting shafts to a predetermined turning position.

In a fifth embodiment, the battery holding portion further comprises a key cylinder for operating the release protrusion to protrude by use of an operation key.

In a sixth embodiment, a supporting protrusion is provided on an inner wall of each of the engaging recessed portions, the inner wall being approximately orthogonal to an insertion direction of the supporting shafts. A notch reaching a region including a rotational center is provided in an outer surface of each of the supporting shafts. The notch is formed to allow insertion of a tip end portion of the supporting protrusion to the region including the rotational center, when the supporting shafts are inserted into the corresponding engaging recessed portions from the direction orthogonal to the shaft, as well as to allow each of the supporting shafts to turn by a predetermined angle around the tip end portion of the supporting protrusion as the center. When the battery unit turns to the position where the battery unit is fixed with the battery holding portion, an edge of each of the supporting shafts facing the notch turns and comes to a back portion of the supporting protrusion so that the supporting shafts are prevented from coming off from the engaging recessed portions.

According to the first embodiment of the invention, the paired supporting shafts of the battery unit are inserted into the corresponding engaging recessed portions of the battery holding portion from the direction approximately orthogonal to the shaft, and the battery side connector is fitted and connected to the vehicle body side connector. In this state, while the battery side connector is turned relative to the battery unit, the battery unit can be turned by the predetermined angle around the supporting shaft to be fixed to the battery holding portion. Accordingly, when attaching the battery unit, the battery side connector can accurately and easily be connected to the vehicle body side connector in coaxial alignment with the supporting shaft. Hence, the present invention can improve workability in attaching the battery unit.

According to the second embodiment of the invention, the engaging recessed portions of the battery holding portion open in the same direction as the direction in which the battery side connector and the vehicle body side connector are fitted and connected. For this reason, it is possible to also connect the battery side connector to the vehicle body side connector, only by pushing in the battery unit so that the supporting shafts are inserted into the corresponding engaging recessed portions from the direction approximately orthogonal to the shaft. In other words, the terminal connection position is the position where the battery unit is caused to swing. Thus, it is possible to further improve workability in attaching the battery unit.

According to the third embodiment of the invention, in the stage before attaching the battery unit to the battery holding portion, the locking claw locks the turning of the battery side connector by the force of the biasing spring. Hence, when the battery unit is pushed in so that the supporting shafts are inserted into the corresponding engaging recessed portions from the direction approximately orthogonal to the shaft, the battery side connector is reliably fitted and connected to the vehicle body side connector. Moreover, after the battery side connector is fitted and connected to the vehicle body side connector, the release protrusion on the battery holding portion side displaces the locking claw to the lock release position to release the locking of the turning of the battery side connector. Accordingly, the following operation of turning the battery unit can be performed smoothly.

According to the fourth embodiment of the invention, when the locking claw is pushed by the release protrusion to release the locking of the turning, and the battery unit in this state is operated to turn and come to the predetermined turning position, the release protrusion is operated to protrude and fit in the lock hole to lock the turning of the battery unit. Thus, the turning of the battery unit can be locked easily by operating the release protrusion to protrude.

According to the fifth embodiment of the invention, the turning of the battery unit can be locked by operating the key cylinder by use of the operation key. Hence, it is possible to prevent the battery unit from being stolen by removing the operation key after locking.

According to the sixth embodiment of the invention, the supporting protrusion in the engaging recessed portion and the notch on the supporting shaft side allows not only a compact configuration, but also restriction of turning of the battery unit at the fixation position, and prevention of the battery unit from coming off the engaging recessed portions.

Figure 4:
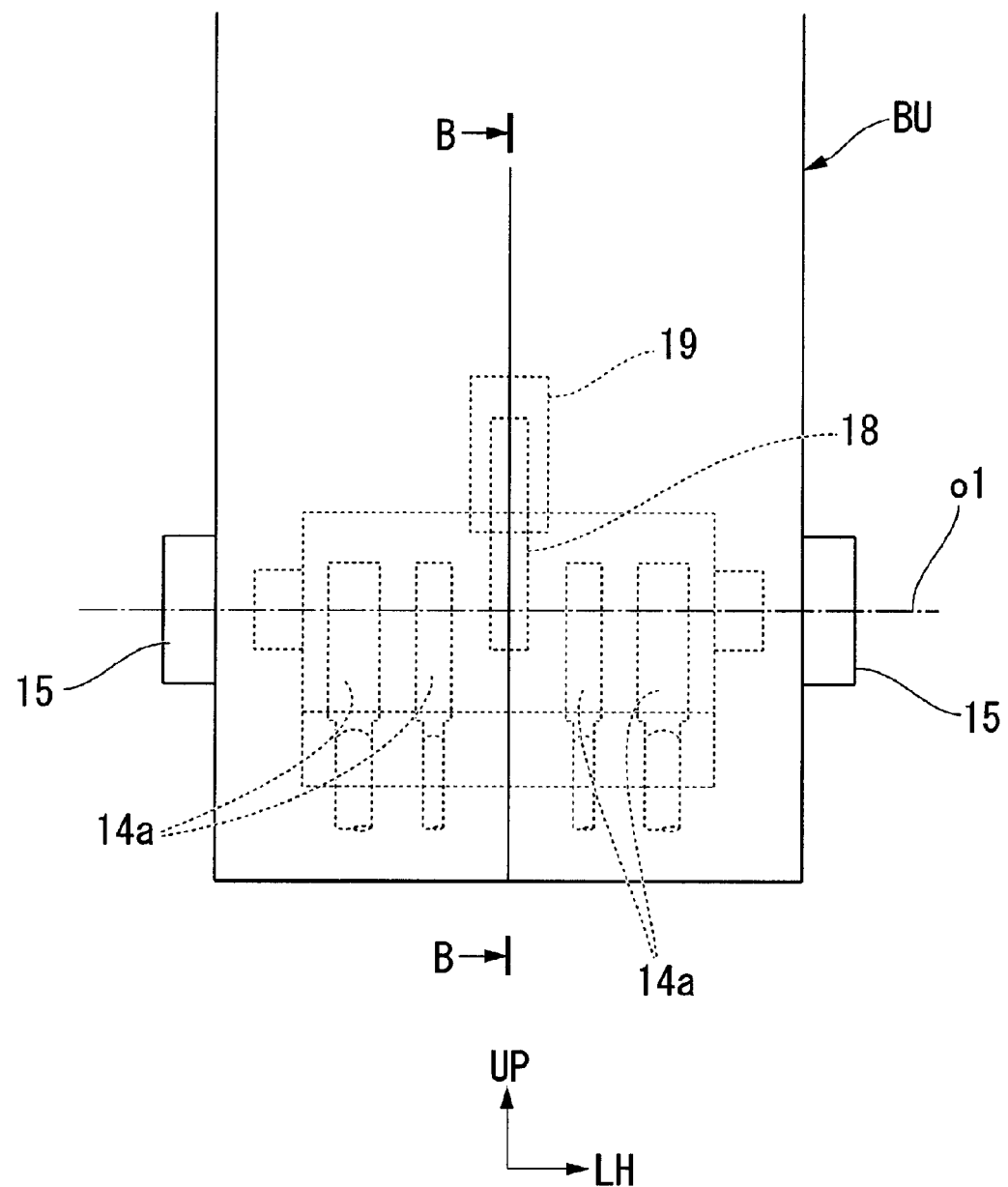
FIG. 4 is a front view of the battery unit of embodiments of the present invention seen from the front side.
Figure 6:
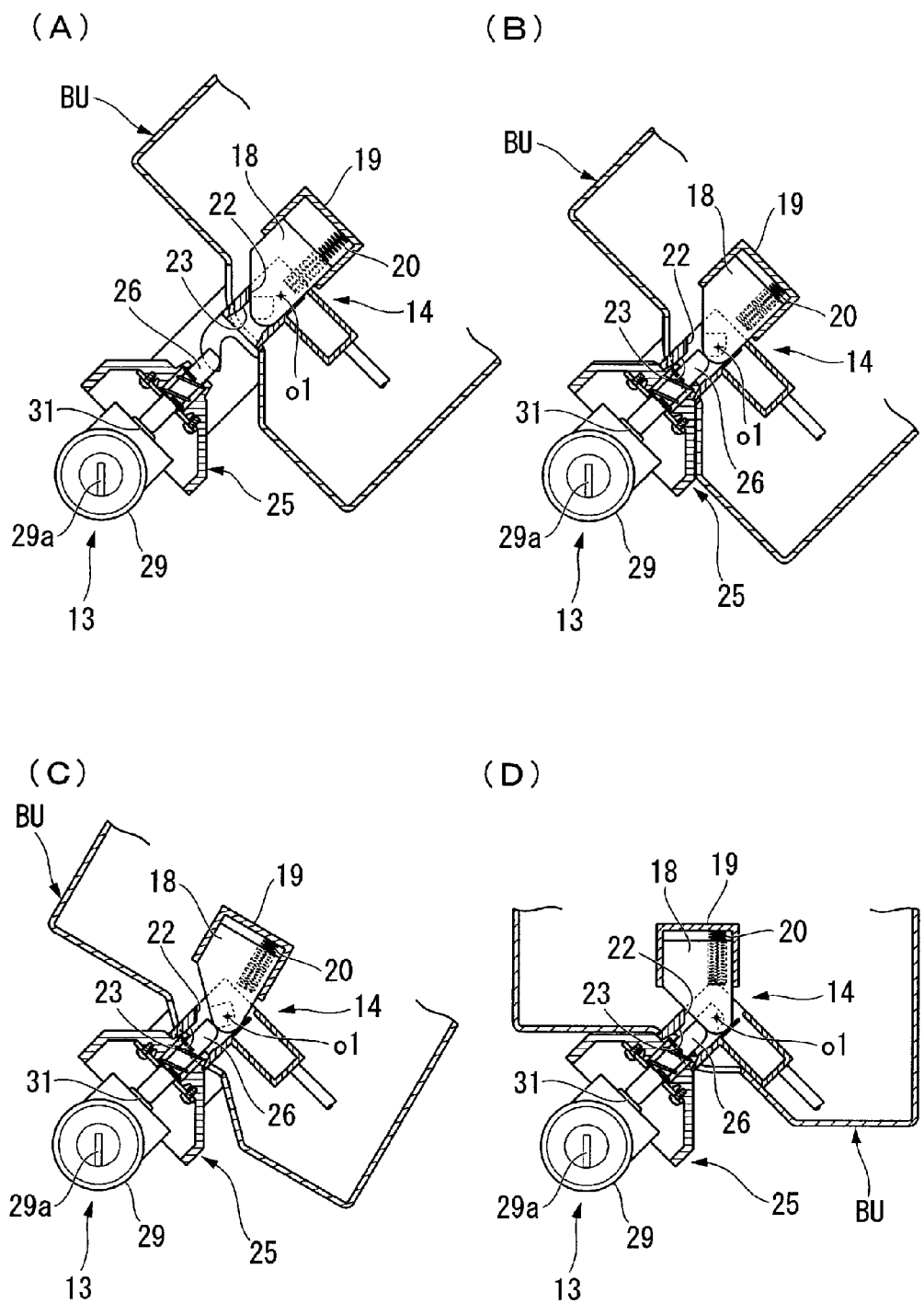

Parts (A) to (D) of FIG. 6 are sectional views corresponding to the B-B section of FIG. 4, showing steps for attaching the battery unit of embodiments of the present invention in the order of (A) to (D).

Figure 3:
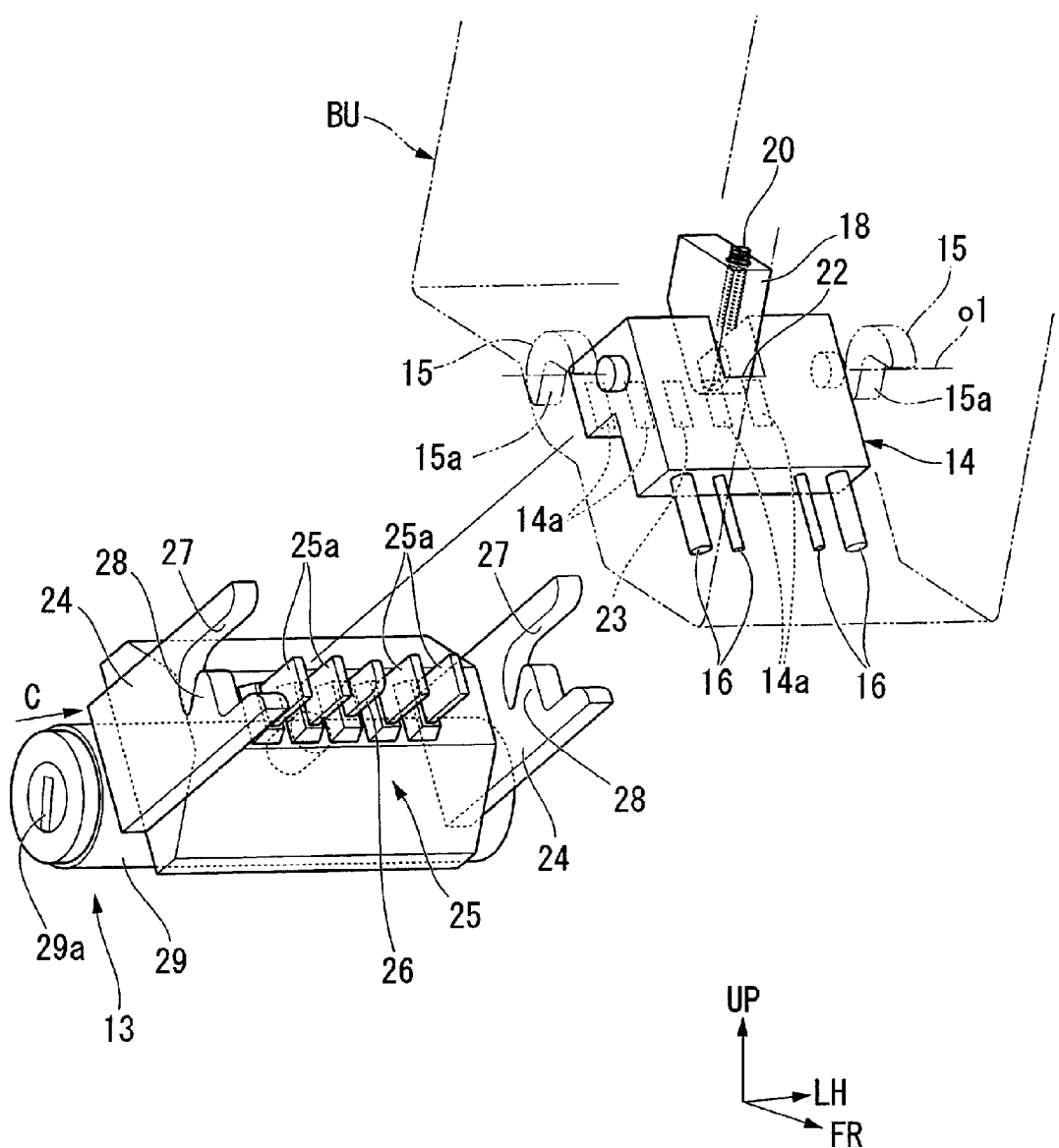
FIG. 3 is a perspective view of a battery holding portion and a part of a battery unit of embodiments of the present invention.
Figure 7:
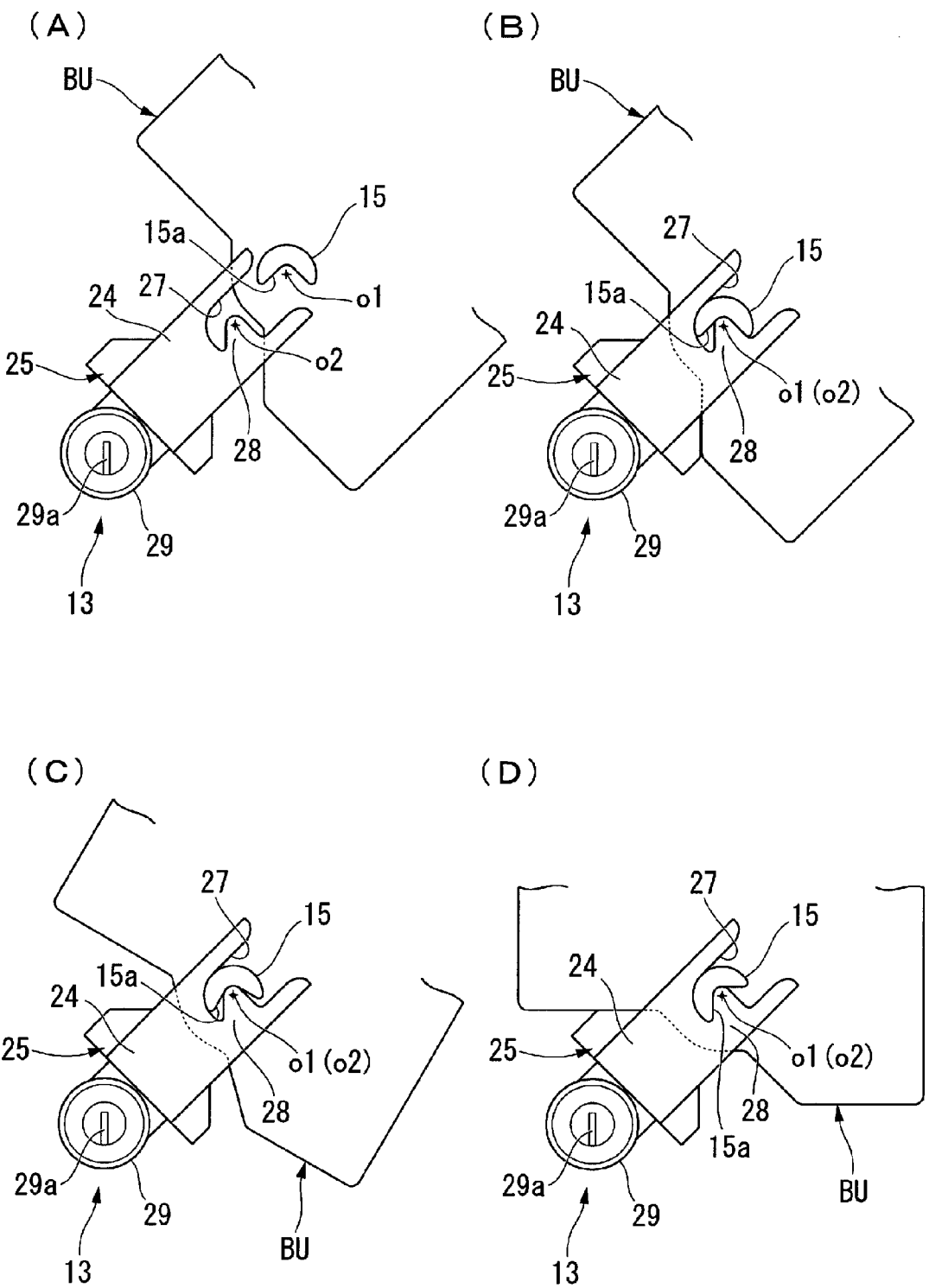

Parts (A) to (D) of FIG. 7 are side views corresponding to an arrow C of FIG. 3, showing steps for attaching the battery unit of embodiments of the present invention in the order of (A) to (D).

Figure 8:
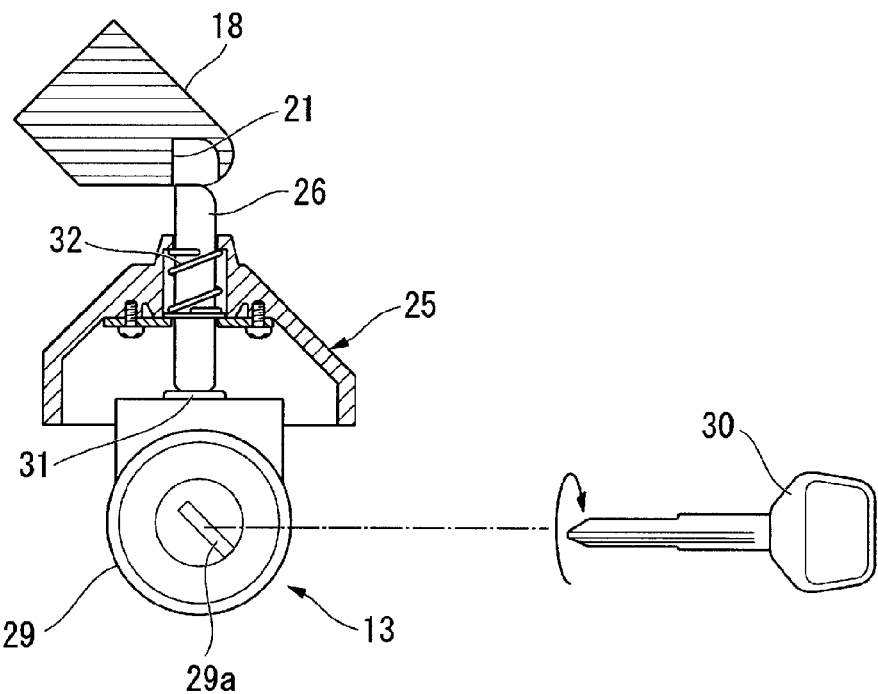
Figure 8:
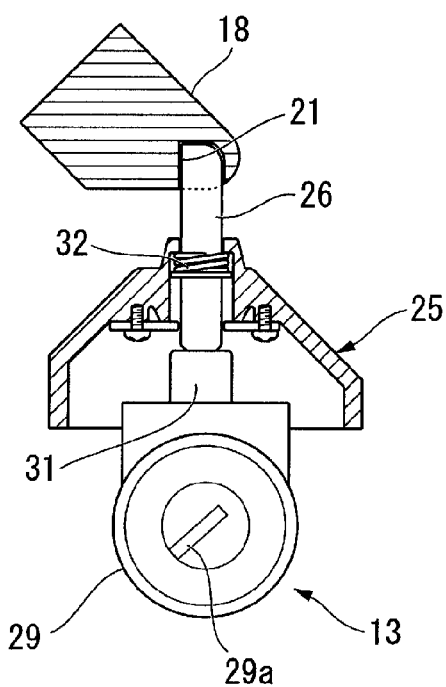

Parts (A) and (B) of FIG. 8 are sectional views corresponding to the B-B section of FIG. 4, showing steps for turnably locking the battery unit of embodiments of the present invention in the order of (A) to (B).

Figure 9:
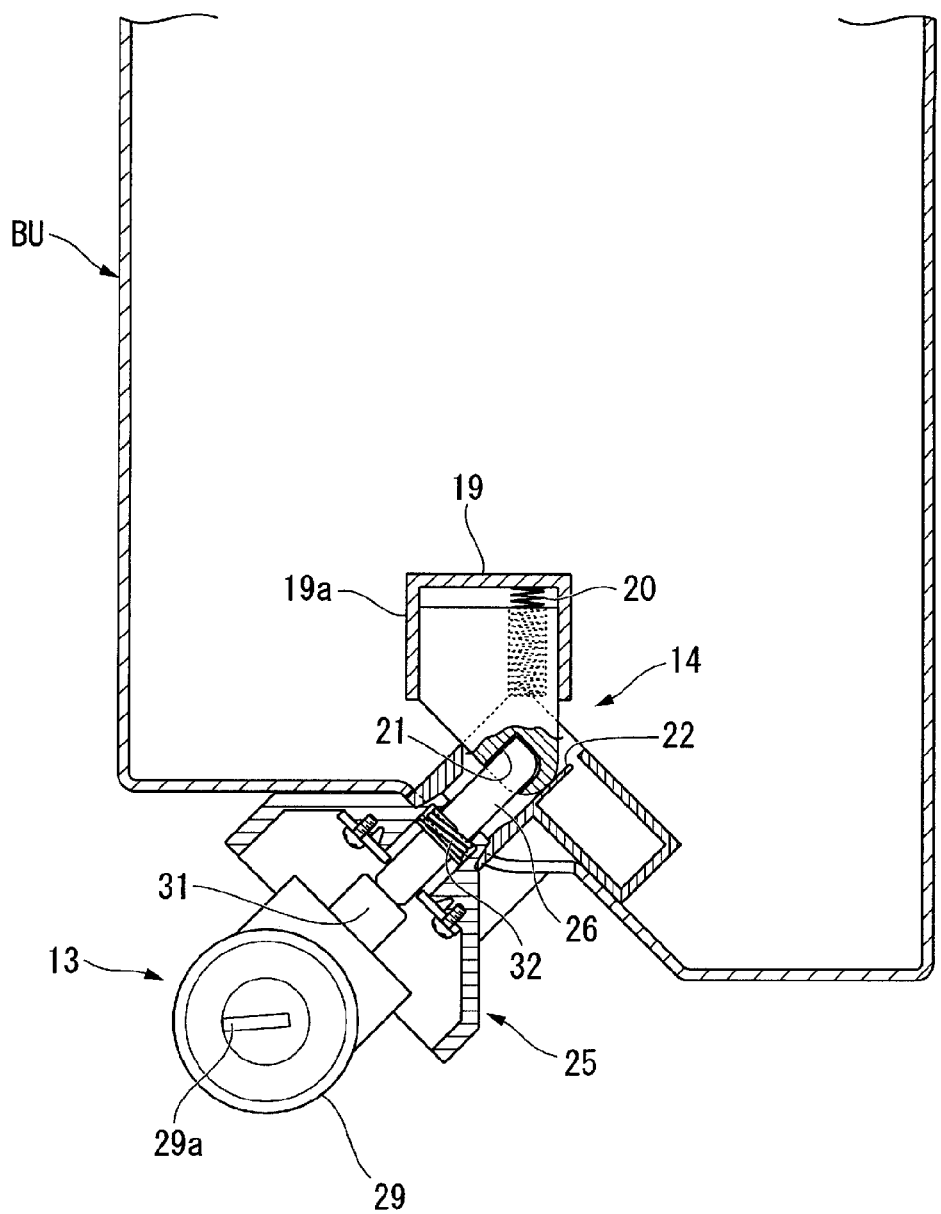

FIG. 9 is a sectional view corresponding to the B-B section of FIG. 4 of the battery holding portion and the battery unit of embodiments of the present invention.

Figure 10:
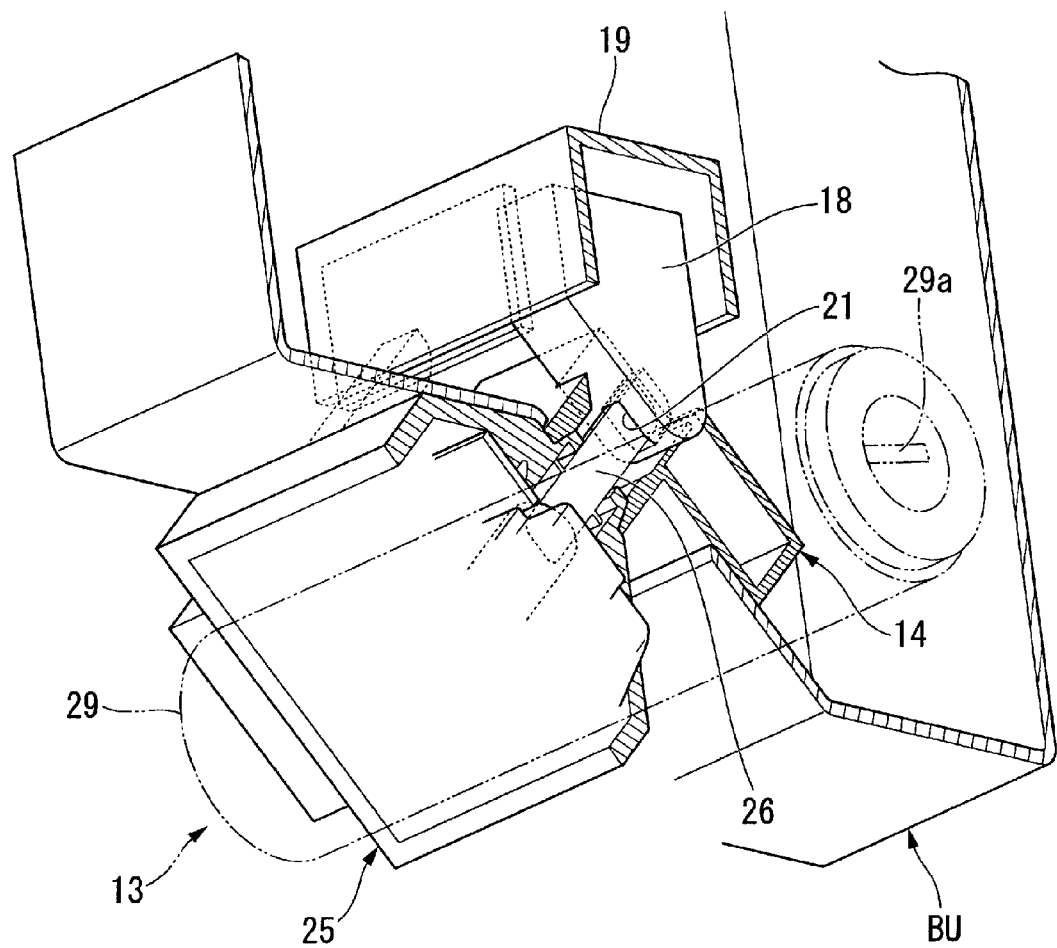
Figure 10:
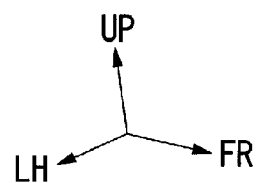

FIG. 10 is a perspective view obtained by cutting the battery holding portion and the battery unit of embodiments of the present invention at the B-B section of FIG. 4.

Figure 11:
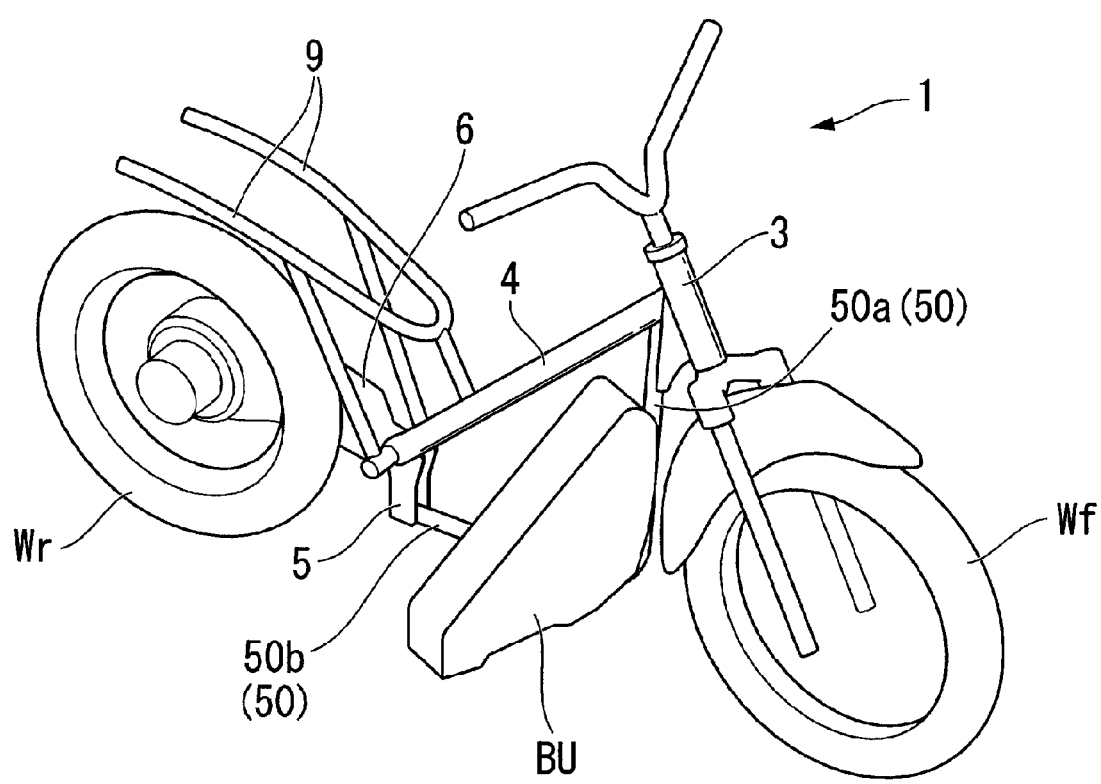

FIG. 11 is a perspective view showing a first modified example of the electric vehicle of embodiments of the present invention.

Figure 12:
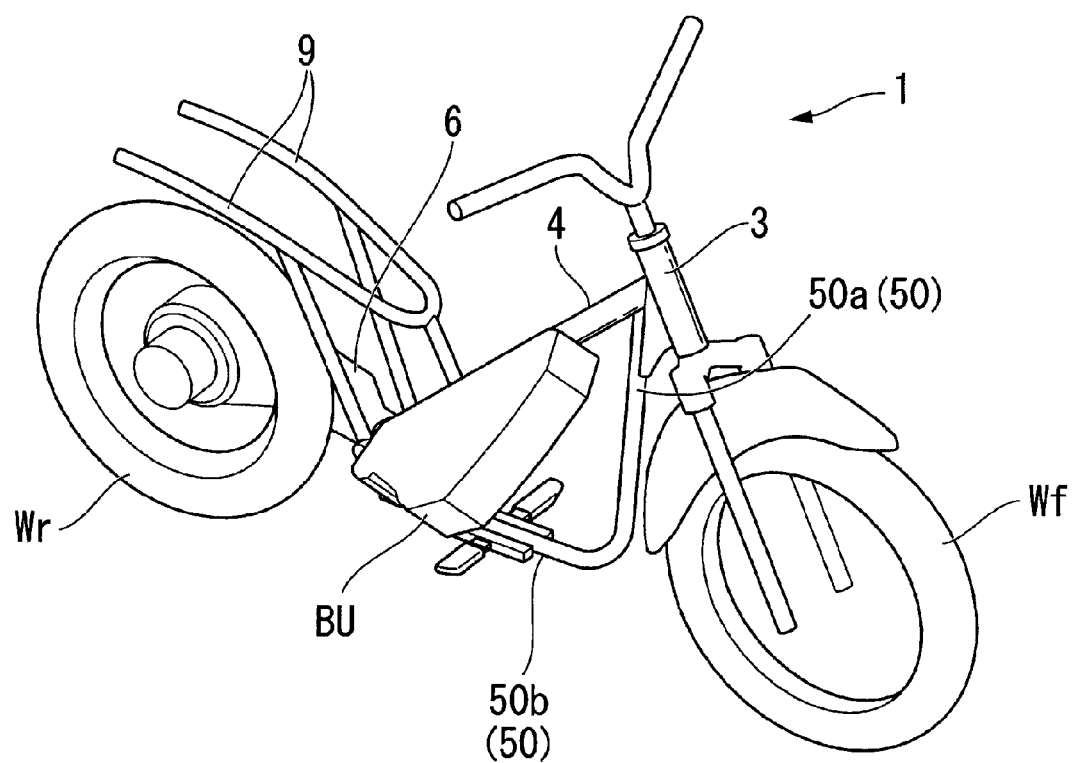

FIG. 12 is a perspective view showing a second modified example of the electric vehicle of embodiments of the present invention.

Figure 13:
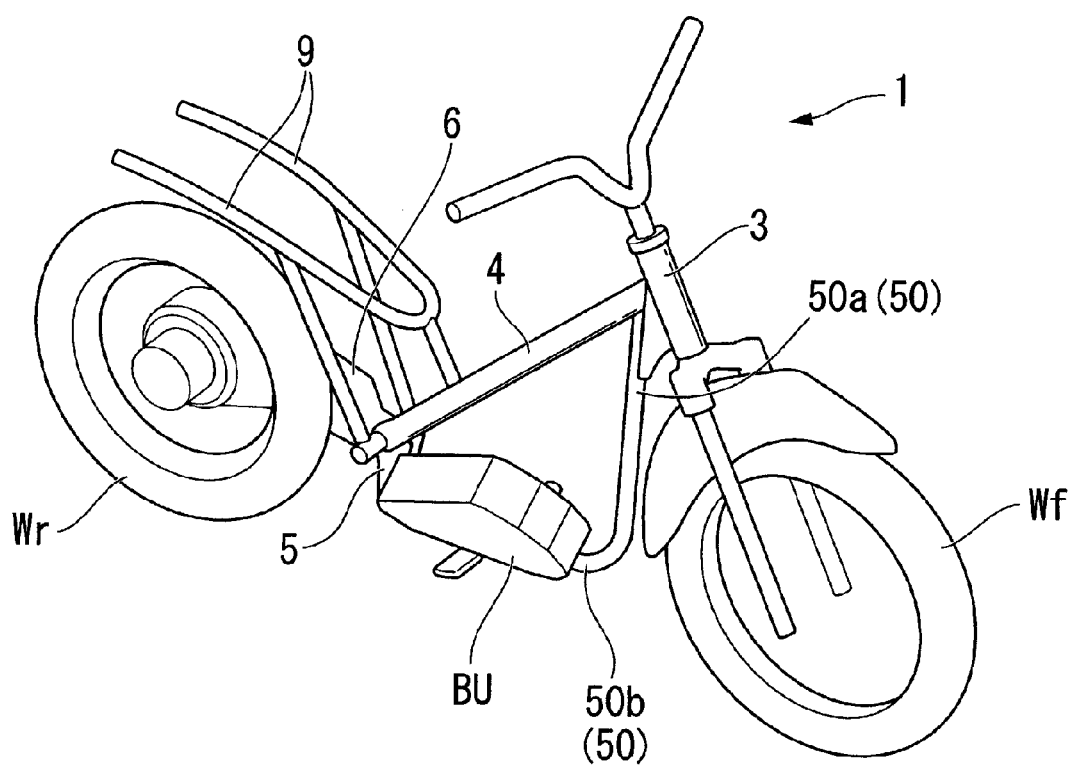

FIG. 13 is a perspective view showing a third modified example of the electric vehicle of embodiments of the present invention.

Figure 14:
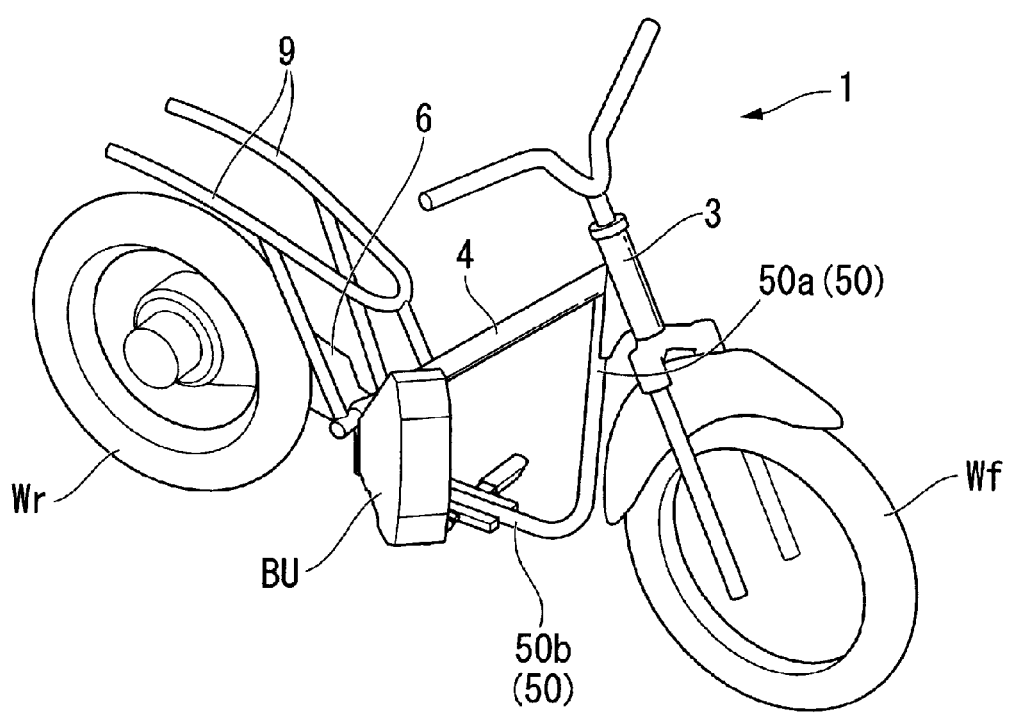

FIG. 14 is a perspective view showing a fourth modified example of the electric vehicle of embodiments of the present invention.

DETAILED DESCRIPTION

Hereinafter, a description is given of embodiments of the present invention with reference to the drawings. Note that front-rear, left-right and other directions in the following description are the same as the directions of a vehicle if not stated otherwise. In addition, in the drawings, an arrow FR indicates the front of the vehicle, an arrow LH indicates the left side of the vehicle, and an arrow UP indicates the upper part of the vehicle.

Figure 1:
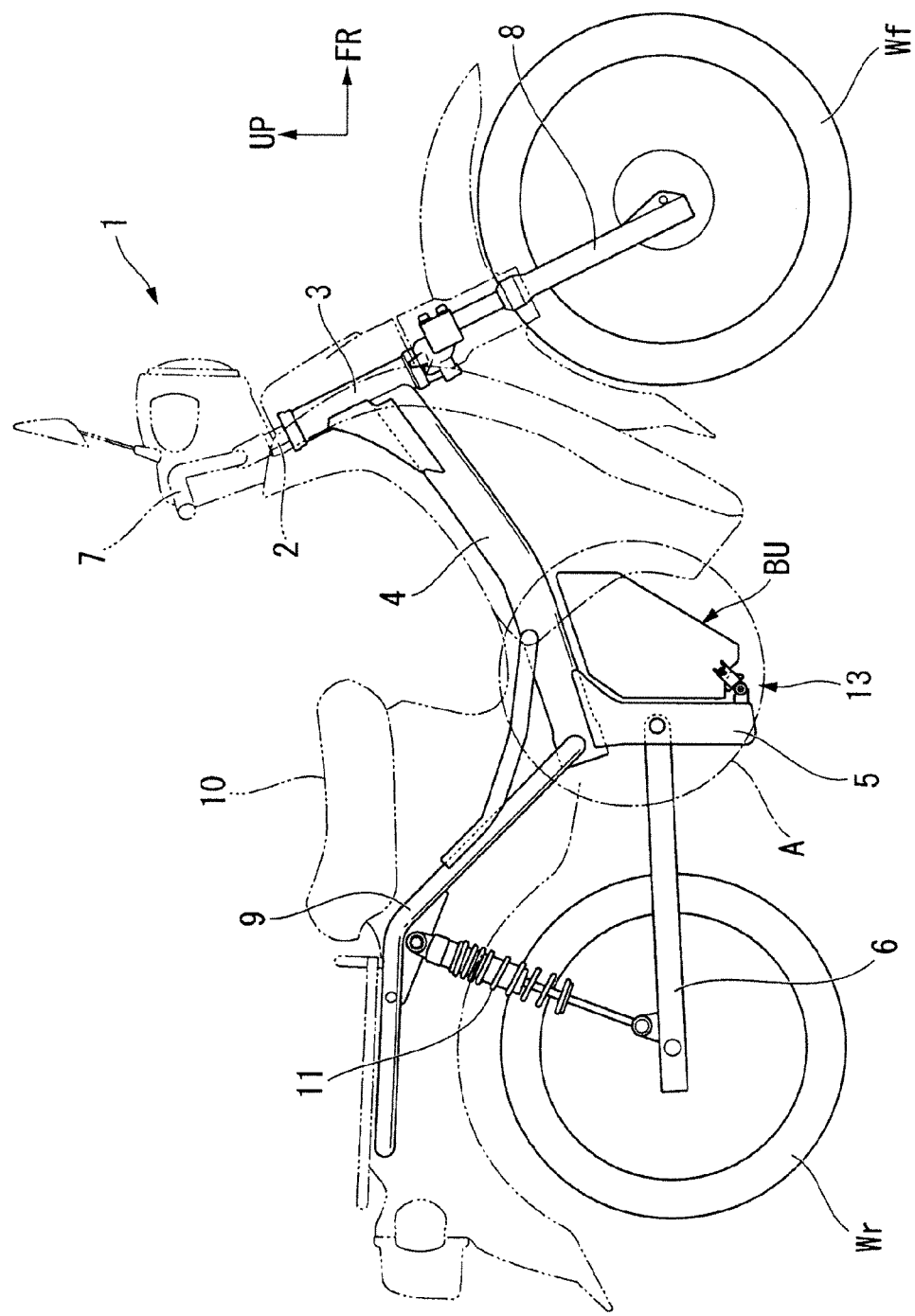
FIG. 1 is a side view of an electric vehicle of embodiments of the present invention.

FIG. 1 is a view showing a side of an electric motorcycle 1 which is one form of an electric vehicle.

The motorcycle 1 includes a main frame 4 joined to a head pipe 3 which turnably holds a handle post 2. The main frame 4 extends obliquely downward toward the rear from the head pipe 3, and a center frame 5 is joined integrally with a lower part of the rear end portion of the main frame 4. A battery unit BU being a power supply source of the vehicle is detachably and attachably installed in front of the center frame 5. In addition, the front end portion of a swing arm 6 supporting a rear wheel is pivotally supported in a swingable manner to the center frame 5. Other than a rear wheel Wr, an electric motor (not shown) for driving the vehicle is attached to the swing arm 6.

A bar handle 7 is attached to the handle post 2. In addition, a front fork 8 supporting a front wheel Wf is connected to be integrally turnable with the handle post 2.

Moreover, paired left and right rear frames 9 extend obliquely upward toward the rear from the rear end portion of the main frame 4, and a seat 10 on which a driver sits is provided above base portions of the rear frames 9. Additionally, the rear end portion of the swing arm 6 is connected to the rear frame 9 via a cushion unit 11.

Figure 2:
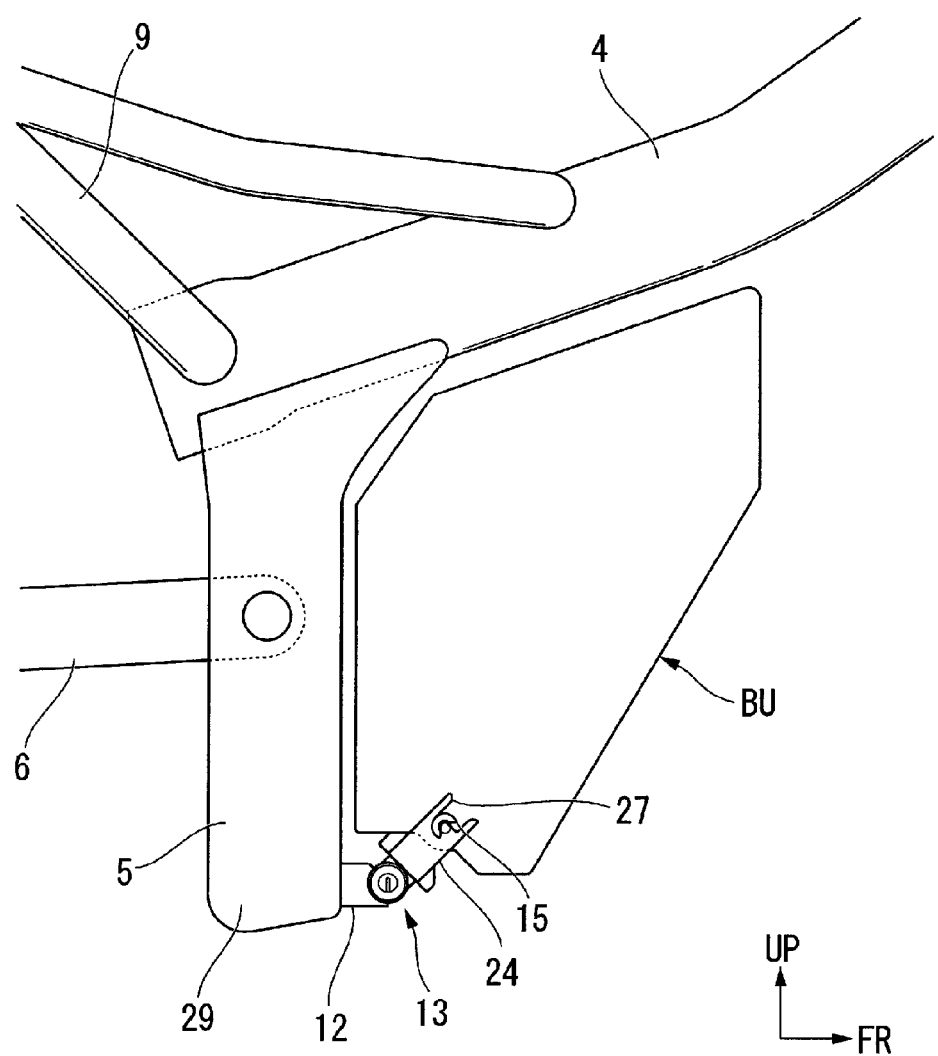
FIG. 2 is an enlarged view of part A of FIG. 1.

FIG. 2 is a view obtained by enlarging an attachment portion of the battery unit BU.

As shown in FIG. 2, in this embodiment, an area between the main frame 4 and the center frame 5 is the area for placing the battery unit BU, and a battery holding block 13 (battery holding portion) is attached to the lower end of the center frame 5 via a bracket 12 protruding frontward. With the battery holding block 13, the battery unit BU is assembled in a frontward-inclined state, turned by a predetermined angle to be brought to an upright posture after connectors are electrically connected, and then fixed within the aforementioned placement area.

Figure 5:
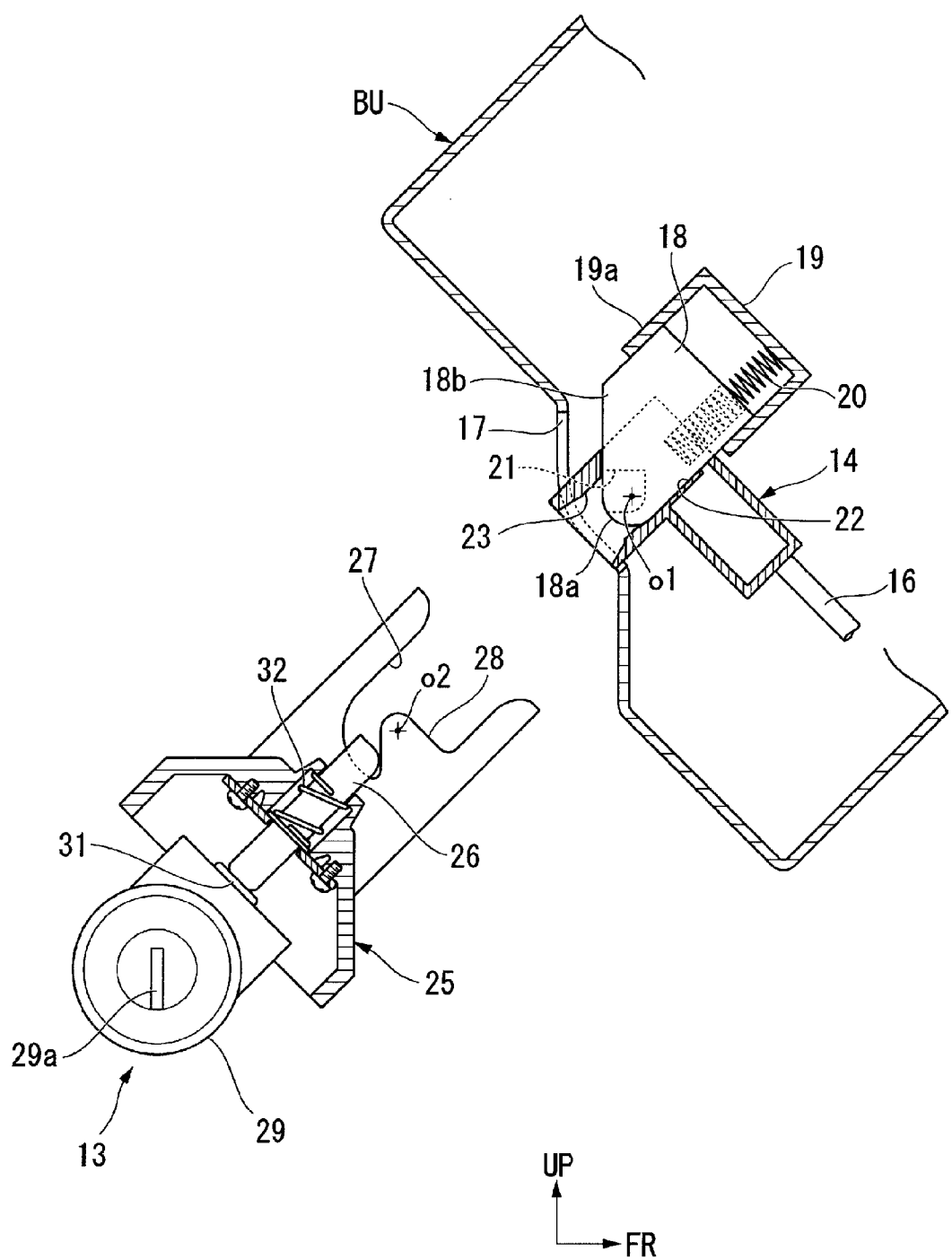
FIG. 5 is a sectional view corresponding to a B-B section of FIG. 4 of the battery holding portion and the battery unit.

FIG. 3 is a perspective view showing a configuration of the inside of the battery holding block 13 and the battery unit BU. FIG. 4 is a front view of the battery unit BU, FIG. 5 is a sectional view of the battery holding block 13 and the battery unit BU, and FIGS. 6 and 7 show steps for attaching the battery unit BU to the battery holding block 13 in the order of (A) to (D).

The battery unit BU is formed to have an almost rectangular horizontal cross section, and includes therein a battery module (not shown) and a battery side connector 14 for drawing power of the battery module to the outside. A stepped portion including a higher portion on the rear side of the vehicle body is provided on a bottom surface of the battery unit BU, and the battery side connector 14 is embedded near a corner of the stepped portion. The battery side connector 14 has four female terminal fittings 14a which are arranged linearly in a vehicle width direction.

Paired supporting shafts 15 projecting toward opposite directions are provided to protrude from side walls on both sides of the battery unit BU in the vehicle width direction. The supporting shafts 15 are provided in a protruding manner near the corner of the stepped portion. The supporting shaft 15 is formed in an almost cylindrical shape having a circular outer surface, with a later-described notch 15a provided in a part of an outer peripheral surface thereof. In addition, the battery side connector 14 embedded in the battery unit BU is turnably supported along the same shaft line as the supporting shafts 15 on both sides thereof. In other words, the battery side connector 14 is provided to be capable of turning relative to the battery unit BU, around a shaft line o1 penetrating the center of the supporting shaft 15.

Moreover, the battery side connector 14 is formed of an integral block having an almost L-shaped cross section, and the corner portion having an L-shaped cross section is the center of turning (o1). Additionally, a direction perpendicular to the shaft line o1 being the rotational center of the battery side connector 14 is the direction in which the four terminal fittings 14a are fitted and connected. Note that in the drawings, reference numeral 16 denotes distribution cables connecting the battery side connector 14 and the battery module provided in the battery unit BU.

As shown in FIG. 5, an opening 17 for exposing an end portion of the battery side connector 14 to the outside is formed near the corner portion of the bottom surface of the battery unit BU, the end portion being on the side where the terminal fittings 14a are formed. The opening 17 is formed to extend toward the rear of the vehicle body, so as not to interfere with the battery side connector 14 when the battery side connector 14 turns relative to the battery unit BU. Additionally, in an initial posture of the battery side connector 14, the terminal fittings 14a face a direction approximately orthogonal to the bottom surface of the battery unit BU. The initial posture is maintained by engaging a locking claw 18 provided inside the battery unit BU with the battery side connector 14.

The locking claw 18 is slidably held in a holder 19 fixedly installed in the battery unit BU. Holding walls 19a of the holder 19 are set to be in parallel with openings of the terminal fittings 14a of the battery side connector 14 in its initial posture. Moreover, a biasing spring 20 is interposed between the bottom of the holder 19 and the locking claw 18, and the locking claw 18 is continuously biased toward its protruding direction by the biasing spring 20. In a tip-end-side area of the locking claw 18 protruding from the holder 19, an apex portion 18a is provided on the front side of the vehicle body, and a flat tapered surface 18b is provided closer to the rear of the vehicle body to be continuous with the apex portion 18a. The apex portion 18a is formed to have an arc-shaped cross section. Additionally, a later-mentioned lock hole 21 is formed in the tapered surface 18b.

Provided in the approximate center of the battery side connector 14 in the vehicle width direction are a fitting slot 22 in which a tip end portion of the locking claw 18 is fitted, and a through hole 23 connecting an end surface of the battery side connector 14 and the bottom of the fitting slot 22. The end surface is on the side on which the terminal fittings 14a of the battery side connector 14 open.

The turning of the battery side connector 14 relative to the battery unit BU is locked by fitting the tip end portion of the locking claw 18 in the fitting slot 22. In addition, the battery side connector 14 is configured such that when the tip end portion of the locking claw 18 receives an external force to be pushed back against the force of the biasing spring 20 for a predetermined amount or more, the tip end portion of the locking claw 18 comes out of the fitting slot 22, and the locking of the turning of the battery unit BU is released. The through hole 23 is provided to be in parallel with the direction in which the terminal fittings 14a of the battery side connector 14 open.

The battery holding block 13 includes paired holding brackets 24 provided to protrude from both end portions of the battery holding block 13 in the vehicle width direction to turnably hold the paired supporting shafts 15 of the battery unit BU. A vehicle body side connector 25 is arranged between the paired holding brackets 24 to be fitted and connected with the corresponding battery side connector 14 of the battery unit BU. A release pin 26 (release protrusion) protruding upward from the center of the vehicle body side connector 25 in the vehicle width direction. In the vehicle body side connector 25, four terminal pins 25a are provided in a protruding manner, and the four terminal pins 25a are to be fitted and connected with corresponding terminal fittings 14a of the battery side connector 14. Moreover, two each of the terminal pins 25a are arranged on both sides of the release pin 26, and are arranged linearly together with the release pin 26 between the paired holding brackets. The release pin 26 is inserted in the through hole 23 of the battery side connector 14. When the battery unit BU is pushed toward the battery holding block 13 in this state, the tip end portion of the release pin 26 comes into contact with the apex portion 18a of the locking claw 18 to push the locking claw 18 until it reaches the lock release position.

As shown in FIGS. 3 and 7, an engaging recessed portion 27 is formed on each of the holding brackets 24. The corresponding supporting shaft 15 on the battery unit BU side is inserted into the engaging recessed portion 27 from a direction orthogonal to the shaft. An opening of the engaging recessed portion 27 opens in the same direction (the direction in which the battery side connector 14 is fitted and connected) as the direction in which the terminal pins 25a of the vehicle body side connector 25 protrude.

In addition, a supporting protrusion 28 is provided on an inner wall of the engaging recessed portion 27, the inner wall being approximately orthogonal to the direction in which the supporting shaft 15 is inserted. The supporting protrusion 28 has an almost triangular shape with an apex whose angle is approximately 45°, and protrudes toward a center o2 of an arc on the bottom side of the engaging recessed portion 27. The tip end portion of the supporting protrusion 28 is in an arc shape having a predetermined radius and whose center coincides with the center o2 of the arc of the engaging recessed portion 27. Note that in this embodiment, the center o2 of the arc on the bottom side of the engaging recessed portion 27 coincides with the center of turning (shaft line o1) of the supporting shaft 15, when the supporting shaft 15 is inserted in the bottom portion of the engaging recessed portion 27.

Meanwhile, the notch 15a formed in the outer peripheral surface of each supporting shaft 15 reaches a region including the rotational center of the supporting shaft 15, and has an almost fan shape with an apex whose angle is approximately 90°. A region at the center of the fan shape of the notch 15a is formed in an arc shape whose center coincides with the rotational center of the supporting shaft 15. The notch 15a of each supporting shaft 15 is formed such that when the supporting shaft 15 is inserted in the corresponding engaging recessed portion from the direction approximately orthogonal to the shaft, the notch 15a allows the tip end portion of the supporting protrusion 28 to be inserted in the region including the rotational center of the supporting shaft 15, and also allows the supporting shaft 15 to turn by a predetermined angle around the tip end portion of the supporting protrusion 28 as the center.

After being inserted into the corresponding engaging recessed portion 27 from the direction approximately orthogonal to the shaft, the supporting shaft is operated to turn with the battery unit BU by approximately 45° toward a fixation position. Both of the notches 15a are formed to allow this turning of the supporting shaft 15. In addition, when the supporting shaft 15 is thus turned by approximately 45°, an edge of the supporting shaft 15 facing the notch 15a turns and comes to a back portion side (the bottom side of the engaging recessed portion 27) of the supporting protrusion 28, whereby the supporting shaft 15 is prevented from coming off from the engaging recessed portion 27.

A key cylinder 29 can be further provided in the battery holding block 13.

FIG. 8 is a view showing actions of the key cylinder 29.

The key cylinder 29 is integrally attached to a back portion side (a lower side) of the vehicle body side connector 25. The key cylinder 29 is turnably operated by inserting an operation key 30 in a key groove 29a (see FIG. 3), whereby an operation pin 31 is moved frontward and backward in the direction of the vehicle body side connector 25.

The release pin 26 protruding upward from the center of the vehicle body side connector 25 is not fixed to the vehicle body side connector 25, but is held to be capable of moving frontward and backward (in and out) in a base block of the vehicle body side connector 25. A lower end of the release pin 26 protruding into the base block is in contact with the operation pin 31 of the key cylinder 29. Hence, the position of the release pin 26 is changed by operating the key cylinder 29 with the operation key 30. Note that in the drawings, reference numeral 32 denotes a return spring continuously biasing the release pin 26 in the backward direction.

FIGS. 9 and 10 are views showing a state in which the release pin 26 and the locking claw 18 are engaged when the release pin 26 is operated in the protruding direction by the key cylinder 29.

As can be seen in the drawings, when the battery unit BU is turned upward by a predetermined angle with the locking claw 18, the tip end portion of the release pin 26 faces the lock hole 21 provided in the tapered surface 18b of the locking claw 18. When the release pin 26 is operated in the protruding direction by the key cylinder 29 in this state, the tip end portion thereof fits in the lock hole 21. Thus, positions of the locking claw 18 and the holder 19 are fixed by the release pin 26, whereby turning of the battery unit BU around the supporting shaft 15 is locked.

Hereinafter, attachment and detachment of the battery unit BU of the motorcycle 1 will be described.

When attaching the battery unit BU to the battery holding block 13 of the vehicle body, the operation pin 31 of the key cylinder 29 is retracted in advance, so that the release pin 26 is in its initial protrusion state (retracted state).

In addition, the locking claw 18 in the battery unit BU is fitted in the fitting slot 22 of the battery side connector 14 by the force of the biasing spring 20. Accordingly, turning of the battery side connector 14 relative to the battery unit BU is locked, and the battery side connector 14 maintains its initial posture.

In this state, an operator holds the battery unit BU in its initial posture where it is inclined by a set angle, and then while maintaining this posture, inserts the supporting shafts 15 at both sides of the battery unit BU into the corresponding engaging recessed portions 27 of the battery holding block 13 from the direction approximately orthogonal to the shaft, as shown in parts (A) and (B) of FIG. 7. At this time, the supporting protrusion 28 in each engaging recessed portion 27 is placed in the notch 15a of the supporting shaft 15, and the tip end portion of the supporting protrusion 28 comes into contact with the bottom portion of the arc shape of the notch 15a.

Concurrently, the release pin 26 on the battery holding block 13 side is inserted in the through hole 23 of the battery side connector 14 as shown in parts (A) and (B) of FIG. 6, and the terminal pins 25a of the vehicle body side connector 25 are fitted and connected to corresponding terminal fittings 14a of the battery side connector 14. Then, the tip end portion of the release pin 26 inserted in the through hole 23 of the battery side connector 14 comes into contact with the apex portion 18a of the locking claw 18 to push the locking claw 18 out of the fitting slot 22. As a result, the battery side connector 14 is allowed to turn relative to the battery unit BU.

Moreover, this operation causes the center of the supporting shaft 15 and the shaft line o1 penetrating the center of turning of the battery side connector 14, to coincide with the center o2 of the arc of the engaging recessed portion 27 on the battery holding block 13 side.

Next, the operator turns the battery unit BU by a predetermined angle around the supporting shaft 15 to bring the whole battery unit BU almost upstraight.

At this time, as shown in parts (C) and (D) of FIG. 6, the locking claw 18 changes the direction of its surface in contact with the release pin 26 while being in sliding contact with the tip end portion of the release pin 26. In the end, the tip end portion of the release pin 26 faces the lock hole 21 in the tapered surface 18b of the locking claw 18.

At this time, as shown in parts (C) and (D) of FIG. 7, the supporting shafts 15 of the battery unit BU turn by a predetermined angle around the tip end portion of the supporting protrusion 28 in the engaging recessed portion 27 as the center, and finally the edge of the supporting shaft 15 facing the notch 15a turns and comes to the back portion side of the supporting protrusion 28. Hence, in this state, displacement of the supporting shaft (battery unit BU) toward the opening side of the engaging recessed portion 27 is restricted by the supporting protrusion 28.

Thereafter as shown in parts (A) and (B) of FIG. 8, the operator inserts the operation key 30 into the key cylinder 29, and turns the operation key 30 to a predetermined position to make the operation pin 31 of the key cylinder 29 protrude therefrom. With this, the tip end portion of the release pin 26 is fitted in the lock hole 21 of the locking claw 18, so that turning of the battery unit BU is locked while the battery unit BU is in the upstraight posture as shown in FIGS. 9 and 10. In this state, the operation key 30 is pulled out of the key cylinder 29.

On the other hand, when detaching the battery unit BU attached to the vehicle body, the operation key 30 is inserted into the key cylinder 29 and turned in a direction opposite to that at the time of attachment to retract the release pin 26. Since this operation releases the locking of the turning of the battery unit BU, the battery unit BU is turned around the supporting shaft 15 from this state to the initial attachment posture. Thereafter, pulling the battery unit BU in the initial attachment posture causes the supporting shafts 15 to come off from the corresponding engaging recessed portions 27, and also disconnects the fitted and connected vehicle body side connector 25 and battery side connector 14.

As has been described, the motorcycle 1 is configured such that the paired supporting shafts 15 of the battery unit BU are inserted into the corresponding engaging recessed portions on the vehicle body side from the direction approximately orthogonal to the shaft, and the battery side connector 14 is fitted and connected to the vehicle body side connector 25. In this state, the whole battery unit BU can be turned to a fixation position, relative to the battery side connector 14 connected to the vehicle body side connector 25. Accordingly, when attaching the battery unit BU, the battery side connector 14 can be accurately and easily connected to the vehicle body side connector 25 in coaxial alignment with the supporting shaft 15.

Particularly in this embodiment, the engaging recessed portions 27 on the vehicle body side open in the same direction as the direction in which the battery side connector 14 and the vehicle body side connector 25 are fitted and connected. For this reason, it is possible to also fit and connect the battery side connector 14 and the vehicle body side connector 25, only by pushing in the battery unit BU so that the supporting shafts 15 are inserted into the corresponding engaging recessed portions from the direction approximately orthogonal to the shaft.

Thus, it is extremely easy to assemble the battery unit BU in the motorcycle 1.

Additionally, in the motorcycle 1, the locking claw 18 for locking the turning of the battery side connector 14 and the biasing spring 20 for biasing the locking claw 18 in the locking direction are provided in the battery unit BU. Hence, when assembling the battery unit BU in the initial attachment posture, the turning of the battery side connector 14 can be restricted to easily and reliably fit and connect the battery side connector 14 and the vehicle body side connector 25.

In the motorcycle, the release pin 26 for releasing the lock of the locking claw 18 when the battery side connector 14 and the vehicle body side connector 25 are fitted and connected is provided on the battery holding block 13 side. Hence, when the fitting and connecting of the battery side connector 14 and the vehicle body side connector 25 are completed, it is possible to smoothly transit to the following turning operation of the battery unit BU.

Furthermore, in the motorcycle 1, the release pin 26 is capable of performing a protruding action, and the lock hole 21 in which the tip end portion of the release pin 26 is fitted is provided in the tapered surface 18b of the locking claw 18. Hence, after fitting and connecting the battery side connector 14 with the vehicle body side connector 25 and turning the battery unit BU to the predetermined position, it is possible to lock the turning of the battery unit BU relative to the battery holding block 13 by making the release pin 26 protrude so that the tip end portion thereof is fitted in the lock hole 21. Accordingly, the battery unit BU can be fixed to the vehicle body with a compact configuration.

Particularly in this embodiment, a configuration is employed in which the release pin 26 is operated to protrude by operating the key cylinder 29 with the operation key 30. For this reason, it is possible to prevent the battery unit BU from being stolen by removing the operation key 30 after locking.

Moreover, in the motorcycle 1, a configuration is employed in which when the supporting shafts 15 of the battery unit BU are inserted into the corresponding engaging recessed portions 27 from the direction approximately orthogonal to the shaft, the supporting protrusion 28 in the engaging recessed portion 27 is inserted in the notch 15a of the supporting shaft 15. Thereafter, when the battery unit BU is turnably operated, the supporting shaft 15 rotates with the supporting protrusion 28 as the rotational center, and at the point when the battery unit BU turns to the fixation position, the edge of the supporting shaft 15 facing the notch 15a turns and comes to the back portion of the supporting protrusion 28. Hence, even though the configuration is compact, it is possible to restrict turning of the battery unit BU at the fixation position, and to prevent the battery unit BU from coming off the engaging recessed portions 27.

Note that the present invention is not limited to the above embodiment, and various design changes can be made without departing from the scope of the invention. For example, although the battery unit BU is attached such that it is inclined toward the front of the center frame 5 in the above embodiment, the battery unit BU may be attached such that it is inclined in the lateral direction of the vehicle body as in the modified examples shown in FIGS. 11 to 14. Configurations similar to those described above can be employed for the battery unit BU and the battery holding portion in these cases.

In the modified examples shown in FIGS. 11 to 14, a sub-frame 50 having an almost L-shape is joined to the lower end of a center frame 5 and the lower end of a front end portion of a main frame 4. A battery unit BU is placed in a space having an almost trapezoidal shape surrounded by the center frame 5, the main frame 4, and the sub-frame 50. In the modified example of FIG. 11, the battery unit BU is turnably attached to the back of a front wall 50a of the sub-frame 50, and in the modified example of FIG. 12, the battery unit BU is turnably attached below the main frame 4. Meanwhile, in the modified example of FIG. 13, the battery unit BU is turnably attached above a lower wall 50*b* of the sub-frame 50, and in the modified example of FIG. 14, the battery unit BU is turnably attached to the front of the center frame 5.

Moreover, although the electric motorcycle is described as an example of an electric vehicle in the above embodiment, the electric vehicle may be a three-wheeled vehicle or a four-wheeled vehicle.

EXPLANATION OF THE REFERENCE NUMERALS

1 MOTORCYCLE (ELECTRIC VEHICLE)
13 BATTERY HOLDING BLOCK (BATTERY HOLDING PORTION)
14 BATTERY SIDE CONNECTOR
15 SUPPORTING SHAFT
15*a* NOTCH
18 LOCKING CLAW
20 BIASING SPRING
21 LOCK HOLE
25 VEHICLE BODY SIDE CONNECTOR
26 RELEASE PIN (RELEASE PROTRUSION)
27 ENGAGING RECESSED PORTION
28 SUPPORTING PROTRUSION
29 KEY CYLINDER
30 OPERATION KEY
BU BATTERY UNIT

The invention claimed is:

1. A vehicle, comprising:
a battery holding portion, comprising
paired engaging recessed portions into which supporting shafts of a battery unit are inserted from a direction orthogonal to a shaft to turnably hold the supporting shafts, and
a vehicle body side connector fixedly disposed between the paired engaging recessed portions and fitted and connected with a battery side connector; and
a battery unit configured to be detachably attached to the battery holding portion, the battery unit comprising
paired supporting shafts protruding in opposite directions from outer side surfaces, and
the battery side connector supported coaxially with the paired supporting shafts in a turnable manner, and fitted and connected in a direction orthogonal to the supporting shafts,
wherein the paired supporting shafts of the battery unit are configured to be inserted into the corresponding engaging recessed portions of the battery holding portion from the direction orthogonal to the shaft while the battery side connector is fitted and connected to the vehicle body side connector, and wherein the battery unit is operated to turn around the supporting shafts to a position where the battery unit is fixed with the battery holding portion while causing the battery side connector to turn relative to the battery unit, and thus the battery unit is connected and fixed with the battery holding portion.

2. The vehicle according to claim 1, wherein the engaging recessed portions of the battery holding portion open toward a direction in which the battery side connector is fitted and connected to the vehicle body side connector when the battery unit is in an initial attachment posture.

3. The vehicle according to claim 2, wherein:
the battery unit further comprises a locking claw configured to lock and turn the battery side connector, and a biasing spring configured to bias the locking claw in a locking direction; and wherein
the battery holding portion further comprises a release protrusion for displacing the locking claw against a force of the biasing spring to a lock release position, when the battery unit is pushed into a position where the battery side connector and the vehicle body side connector are fitted and connected.

4. The vehicle according to claim 3, wherein:
the release protrusion is disposed in the battery holding portion so that the release protrusion can be operated to protrude from the battery holding portion; and
the locking claw includes a lock hole into which the release protrusion operated to protrude is fitted to lock turning of the battery unit, when the locking claw is displaced to the lock release position and the battery unit is operated to turn around the supporting shafts to a predetermined turning position.

5. The vehicle according to claim 4, wherein the battery holding portion further comprises a key cylinder configured to operate the release protrusion to protrude by use of an operation key.

6. The vehicle according to claim 1, further comprising:
a supporting protrusion on an inner wall of each of the engaging recessed portions, the inner wall being approximately orthogonal to an insertion direction of the supporting shafts; and
a notch reaching a region including a rotational center in an outer surface of each of the supporting shafts,
wherein the notch is configured to allow insertion of a tip end portion of the supporting protrusion to a region including the rotational center, when the supporting shafts are inserted into the corresponding engaging recessed portions from the direction orthogonal to the shaft, and to allow each of the supporting shafts to turn by a predetermined angle around the tip end portion of the supporting protrusion as the center, and wherein
when the battery unit turns to the position where the battery unit is fixed with the battery holding portion, an edge of each of the supporting shafts facing the notch turns and comes to a back portion of the supporting protrusion so that the supporting shafts are prevented from coming off from the engaging recessed portions.

7. A vehicle, comprising:
battery holding means for holding a battery, said battery holding means including paired engaging recessed means for receiving supporting shafts of a battery means therein, said supporting shafts being inserted from a direction orthogonal to a shaft to turnably hold the supporting shafts, and vehicle body side connector means for connecting with a battery side connector means, said vehicle body side connector means being fixedly disposed between the paired engaging recessed means, said vehicle further comprising
the battery means for providing battery power, said battery means also for being detachably attached to the battery holding means, the battery means comprising the supporting shafts protruding in opposite directions from outer side surfaces, and the battery side connector means supported coaxially with the paired supporting shafts in a turnable manner and fitted and connected in a direction orthogonal to the paired supporting shafts,
wherein the supporting shafts of the battery means are inserted into the corresponding engaging recessed means from the direction orthogonal to the shaft while the battery side connector means is fitted and connected to the vehicle body side connector means, and wherein the battery means is configured to turn around the supporting shafts to a position where the battery means is fixed with the battery holding means while causing the battery side connector means to turn relative to the battery means, and thus the battery means is connected and fixed with the battery holding means.

8. The vehicle according to claim 7, wherein the engaging recessed means of the battery holding means opens toward a direction in which the battery side connector means is fitted and connected to the vehicle body side connector means when the battery means is in an initial attachment posture.

9. The vehicle according to claim 8, wherein the battery means further comprises locking means for locking and turning of the battery side connector means, and spring means for biasing the locking claw means in a locking direction, and wherein
the battery holding means further comprises a release protrusion means for displacing the locking claw means against a force of the biasing means to a lock release position, when the battery means is pushed into a position where the battery side connector means and the vehicle body side connector means are fitted and connected.

10. The vehicle according to claim 9, wherein the release protrusion means is disposed in the battery holding means so that the release protrusion means can be operated to protrude from the battery holding means, and wherein the locking claw means includes a lock hole into which the release protrusion means operated to protrude is fitted to lock turning of the battery means, when the locking claw means is displaced to the lock release position and the battery means is operated to turn around the supporting shafts to a predetermined turning position.

11. The vehicle according to claim 10, wherein the battery holding means further comprises key cylinder means for operating the release protrusion means to protrude by use of an operation key.

12. The vehicle according to claim 7, further comprising:
supporting protrusion means disposed on an inner wall of each of the engaging recessed means, the inner wall being approximately orthogonal to an insertion direction of the supporting shaft; and
notch means for engaging the supporting protrusion means, said notch means reaching a region including a rotational center, said notch means disposed in an outer surface of each of the supporting shafts,
wherein the notch means is for allowing insertion of a tip end portion of the supporting protrusion means to a region including the rotational center, when the supporting shafts are inserted into the corresponding engaging recessed means from the direction orthogonal to the supporting shaft, and to allow each of the supporting shafts to turn by a predetermined angle around the tip end portion of the supporting protrusion means as the center, and
wherein when the battery means turns to the position where the battery means is fixed with the battery holding means, an edge of each of the supporting shafts facing the notch means turns and comes to a back portion of the supporting protrusion means so that the supporting shafts are prevented from coming off from the engaging recessed means.

* * * * *